US005338048A

United States Patent [19]

Medina

[11] Patent Number: 5,338,048

[45] Date of Patent: Aug. 16, 1994

[54] COLLAPSIBLE WHEELCHAIR

[76] Inventor: Henry Medina, 4 Sleepy La., Melville, N.Y. 11747

[21] Appl. No.: 59,705

[22] Filed: May 10, 1993

[51] Int. Cl.[5] .................... B62B 5/02

[52] U.S. Cl. .................... 280/5.22; 280/250.1; 280/DIG. 10; 297/DIG. 4

[58] Field of Search .................... 280/5.22, 5.24, 5.2, 280/250.1, 304.1, DIG. 10; 297/DIG. 4

[56] References Cited

U.S. PATENT DOCUMENTS

| | | | |
|---|---|---|---|
| 1,341,470 | 5/1920 | Kinnaird | 474/237 |
| 1,949,282 | 2/1934 | Murray | 297/18 |
| 2,072,222 | 3/1937 | Schuttkus | 280/5.22 |
| 2,214,311 | 9/1940 | Stevens | 280/5.22 |
| 2,680,026 | 6/1954 | Cushman | 280/43.2 |
| 2,715,533 | 8/1955 | Strausberg | 280/5.22 |
| 2,883,731 | 4/1959 | Wells | 280/47.26 |
| 3,106,980 | 10/1963 | Rogneby | 180/9.22 |
| 3,137,511 | 6/1964 | Weil et al. | 280/5.24 |
| 3,178,193 | 4/1965 | Grogan | 280/5.26 |
| 3,231,290 | 1/1966 | Weyer | 280/5.22 |
| 3,567,236 | 11/1968 | Powers | 280/5.32 |
| 3,580,591 | 5/1971 | Coffey et al. | 280/5.32 |
| 3,679,257 | 7/1972 | Jacuzzi et al. | 297/DIG. 4 X |
| 3,709,556 | 1/1973 | Allard et al. | 297/188 |
| 3,990,745 | 11/1976 | Rodaway | 297/DIG. 4 X |
| 4,033,595 | 7/1977 | Mauch | 280/5.22 |
| 4,044,850 | 8/1977 | Winsor | 280/5.22 X |
| 4,130,291 | 12/1978 | Saethre et al. | 280/5.22 |
| 4,136,888 | 1/1979 | Bowie, Jr. et al. | 280/5.22 |
| 4,179,012 | 12/1979 | Heberle | 187/12 |
| 4,222,449 | 9/1980 | Feliz | 280/5.2 X |
| 4,431,076 | 2/1984 | Simpson | 297/DIG. 4 X |
| 4,473,234 | 9/1984 | Egen | 280/5.22 |
| 4,556,229 | 12/1985 | Bihler et al. | 280/5.22 |
| 4,585,241 | 4/1986 | Misawa et al. | 280/5.22 |
| 4,688,813 | 8/1987 | Misawa et al. | 280/5.22 |
| 4,805,925 | 2/1989 | Haury et al. | 280/250.1 |
| 4,834,413 | 5/1989 | Patel et al. | 280/304.1 |
| 4,898,256 | 2/1990 | Lehner | 280/5.22 X |
| 4,962,941 | 10/1990 | Rembos | 280/5.22 |
| 4,966,392 | 10/1990 | Featon et al. | 297/DIG. 4 X |
| 4,989,836 | 2/1991 | Hudson, III et al | 297/DIG. 4 X |
| 5,036,929 | 8/1991 | Trougouboff | 280/5.22 |
| 5,074,574 | 12/1991 | Carwin | 280/304. 1 |
| 5,102,195 | 4/1992 | Axelson et al. | 297/440 |
| 5,123,495 | 6/1992 | Littlejohn et al. | 280/5.22 X |
| 5,127,709 | 7/1992 | Rubinstein et al. | 297/DIG. 4 X |
| 5,137,295 | 8/1992 | Peek | 280/304.1 |
| 5,158,309 | 10/1992 | Quigg | 280/5.22 |
| 5,181,733 | 1/1993 | Tague | 280/304.1 X |

FOREIGN PATENT DOCUMENTS

| | | | |
|---|---|---|---|
| 1067443 | 12/1979 | Canada . | |
| 1084861 | 9/1980 | Canada . | |
| 1223611 | 6/1987 | Canada . | |
| 1046444 | 10/1966 | United Kingdom | 280/5.22 |

OTHER PUBLICATIONS

Product brochure titled "Garaventa Stair-Lift" (1991) from Garaventa (Canada) Ltd., Surrey British Columbia.

Product brochure titled "Garaventa Stair-Porter" (1992) from Garaventa (Canada) Ltd., Surrey, British Columbia.

Product brochure titled "Garaventa Evacu-Trac" (1992) from Garaventa (Canada) Ltd., Surrey, British Columbia.

*Primary Examiner*—Margaret A. Focarino
*Assistant Examiner*—Kevin Hurley
*Attorney, Agent, or Firm*—Scully, Scott, Murphy & Presser

[57] ABSTRACT

A collapsible carriage or wheelchair, generally comprising a main frame, a seating assembly, a pair of wheel subassemblies, and a pair of rail assemblies. Preferably, the wheelchair further includes a back support assembly, an upper frame section, a front wheel, a front support assembly, and a harness system. The elements and components of the wheelchair are connected together so that the wheelchair can be quickly and easily expanded from a collapsed form to an open form. Generally, the seating assembly is provided to form a seat for a person, the wheel subassemblies are used to support the wheelchair for movement over floors and other flat surfaces, and the rail assemblies are provided to support the wheelchair for movement down stairs. The back support assembly helps to hold the wheelchair stationary while a person is being seated in the chair, the upper frame section provides direct support for the head and upper back of a person seated in the chair, and the harness system is used to hold a person in the wheelchair.

23 Claims, 8 Drawing Sheets

COLLAPSIBLE WHEELCHAIR

BACKGROUND OF THE INVENTION

This invention generally relates to carriages or wheelchairs specifically adapted to move down stairs; and more specifically, to such carriages or wheelchairs that are particularly well-suited for use in emergency conditions.

Many people are unable to climb or descend stairs, or have considerable difficulty doing so. These people, if they live or work in, or otherwise use, high rise buildings, normally rely on elevators to move up and down the floors of the buildings. However, in some situations, such as the loss of electrical power, a fire, a bomb threat or explosion, and other emergency conditions, the elevators in a building are either not available or should not be used; and in these situations, the stairs of the building are the only means of egress from the building. Under most such circumstances, there are able-bodied people present who can assist those who require help descending stairs; nevertheless, it may be very difficult or even impossible to evacuate safely all those who need such assistance.

SUMMARY OF THE INVENTION

An object of this invention is to improve carriages or wheelchairs of the type that are specifically designed to move down stairs.

Another object of the present invention is to provide an emergency evacuation wheelchair, which is particularly well suited to move down stairs, that may be quickly and easily opened from a small, collapsed position to an erect, operable position.

Another object of this invention is to provide a collapsible, emergency evacuation wheelchair with an improved assembly to support the wheelchair as it is moved down stairs.

A further object of the present invention is to provide a collapsible, emergency evacuation wheelchair having a lateral belt assembly to support the wheelchair as it moves down stairs, with a locking mechanism to selectively lock that lateral belt assembly in an operable position.

Still another object of this invention is to provide a collapsible, emergency evacuation wheelchair that requires only one person to open the wheelchair, to assist another person into the chair, and to move the chair down stairs.

Another object of the present invention is to provide an emergency evacuation wheelchair with a back stand that may be selectively used to help hold the wheelchair in a stable, stationary position while a person is seated in the chair.

A further object of the present invention is to provide a collapsible, emergency evacuation wheelchair having a unique occupant restraint system that securely holds an occupant in the chair while the chair is being moved down stairs.

Still another object of this invention is to provide a collapsible, emergency evacuation wheelchair with a rear wheel assembly that supports the chair for movement over most surfaces and that also helps to support the chair as it moves down stairs.

An object of the present invention is to provide a wheelchair that is specifically designed to move down stairs, with a very simple and effective and easily adjustable brake assembly to help control movement of the wheelchair down stairs.

These and other objective are attained with a collapsible carriage or wheelchair, generally comprising a main frame, a seating assembly, a pair of wheel subassemblies, and a pair of rail assemblies. Preferably, the wheelchair further includes a back support assembly, an upper frame section, a front wheel, a front support assembly, and a harness system. Generally, the seating assembly is provided to form a seat for a person, the wheel subassemblies are used to support the wheelchair for movement over floors and other flat surfaces, and the rail assemblies are provided to support the wheelchair for movement down stairs. The back support assembly helps to hold the wheelchair stationary while a person is being seated in the chair, the upper frame section provides direct support for the head and upper back of a person seated in the chair, and the harness system is used to hold a person in the wheelchair.

The elements and components of the wheelchair are connected together so that the wheelchair can be expanded from a collapsed form to an open form. In its collapsed form, the wheelchair has a small, compact size and shape; and, for example, the wheelchair can be easily mounted on a wall or stored in a closet or room without occupying a significant amount of space. When the wheelchair is opened, a person can be safely and securely seated and moved in the chair, and in particular, the chair can be easily moved down stairs.

Preferably, each of the rail assemblies includes a rail member, an endless belt and a multitude of belt support rollers. The rail member of the rail assembly is pivotally connected to the main frame of the wheelchair, and the support rollers are rotatably supported by and positioned along the rail member. The endless belt is mounted on one of the wheel subassemblies of the wheelchair and on the multitude of support rollers for movement around an endless path. When the wheelchair moves down a series of steps, the belt engages and moves downward over the edges of those steps, guiding and supporting movement of the wheelchair down the steps.

Preferably, each of the wheel subassemblies includes two co-axial wheels or discs supported for independent rotation. One of these wheels forms a circumferential channel or groove, and the belt of the rail assembly is mounted in that circumferential groove for movement around the wheel subassembly. In addition, preferably each rail assembly further includes a braking subassembly to apply an adjustable pressure to the endless belt to help control movement of the carriage down steps.

The back support assembly may be pivoted between raised and lowered positions. In the lowered position, the support assembly engages the surface on which the wheelchair is located to help support the wheelchair in a stable, stationary position on that surface; and in the raised position, the back support assembly does not interfere with movement of the wheelchair. The preferred embodiment of the back support assembly includes a support stand pivotally connected to the rail assemblies of the wheelchair for movement between raised and lowered positions. In addition, means are provided to hold the support stand in its raised position, and means are provided to hold the support stand in its lowered position.

The upper frame section of the wheelchair is connected to and supported by the main frame of the wheelchair for movement between retracted and extended positions. Preferably, when the upper frame section is in its extended position, the frame section extends upward from the top end of main frame, generally parallel thereto; and when the upper frame section is in its retracted position, the upper frame section extends generally downward from the top end of the main frame, generally rearward of the main frame.

The front support assembly provides additional support for the seating assembly of the wheelchair, and the preferred embodiment of the front support assembly includes a front leg and a pair of lateral support members. The front leg is pivotally connected to and extends downward from the seating assembly. The lateral support members are pivotally connected to and extend from a lower portion of the main frame of the wheelchair, and these lateral support members are also pivotally connected to the front leg of the front support assembly. As the seating assembly pivots from the closed position to the open position, the seating assembly moves the elements of the front support assembly into an open position, in which the support assembly engages the surface on which the wheelchair is positioned. As the seating assembly pivots from the open position to the closed position, the seating assembly pulls the components of the front support assembly into a closed position, in which those components are closely adjacent to the main frame of the wheelchair.

Preferably, the harness system includes first, second, and third belt sections and a head band. The first and second belt sections are mounted on the main frame of the wheelchair, and include means to connect these belt sections together across the front of a person seated in the wheelchair. The third belt section is mounted on the seating assembly of the wheelchair and is positioned so that it extends between the legs of the person seated in the chair. This third belt section includes means to connect the belt section to the first and second belt sections.

The head band is mounted on the upper frame section of the wheelchair to help hold stationary the head of the person in the wheelchair. The head band can be slid along the upper frame section to fit the person seated in the chair, and also so that the head band does not prevent movement of the upper frame section between its extended and retracted positions.

Further benefits and advantages of the invention will become apparent from a consideration of the following detailed description given with reference to the accompanying drawings, which specify and show preferred embodiments of the invention.

DETAILED DESCRIPTION OF THE PREFERRED EMBODIMENTS

Figure 1:
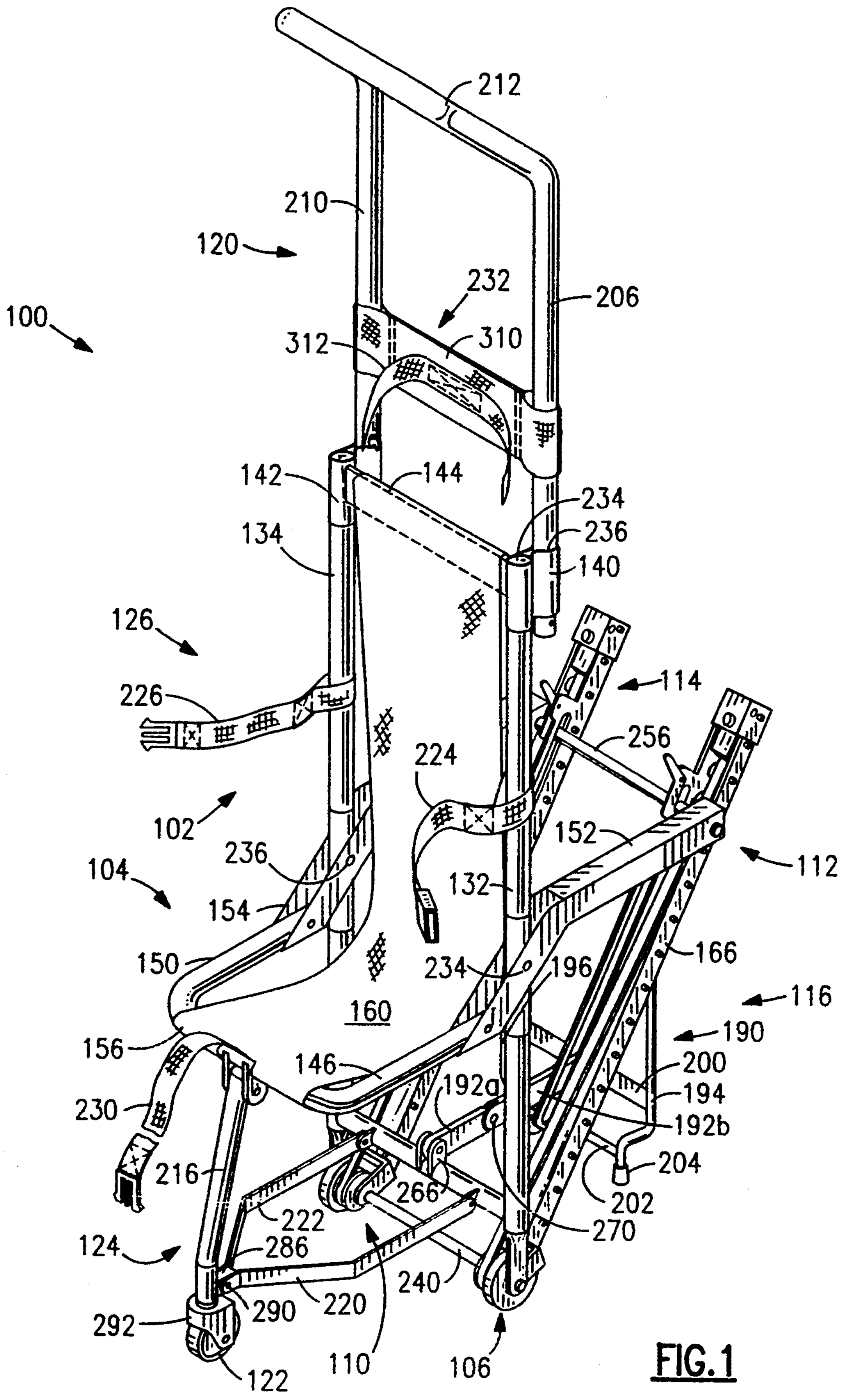
FIG. 1 Is a perspective view of a wheelchair embodying the present invention.

FIG. 1 illustrates collapsible carriage or wheelchair 100, generally comprising main frame 102, seating assembly 104, wheel subassemblies 106 and 110 and rail assemblies 112 and 114. Preferably, the wheelchair further includes back support assembly 116, upper frame section 120, front wheel 122, front support assembly 124, and harness system 126. Generally, seating assembly 104 is provided to form a seat for a person, wheel subassemblies 106 and 110 are used to support the wheelchair for movement over floors and other flat surfaces, and rail assemblies 112 and 114 are provided to support the wheelchair for movement down stairs. Back support assembly 116 helps to hold the wheelchair stationary while a person is being seated in the chair, upper frame section 120 provides direct support for the head and upper back of a person seated in the chair, and harness system 126 is used to hold a person in the wheelchair.

Figure 2:
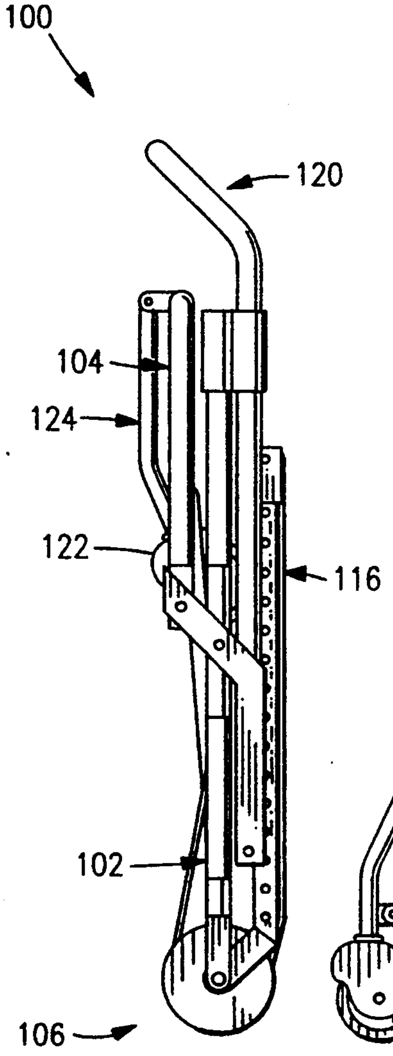
FIG. 2 is a side view of the wheelchair and showing the chair in its collapsed position.
Figure 3:
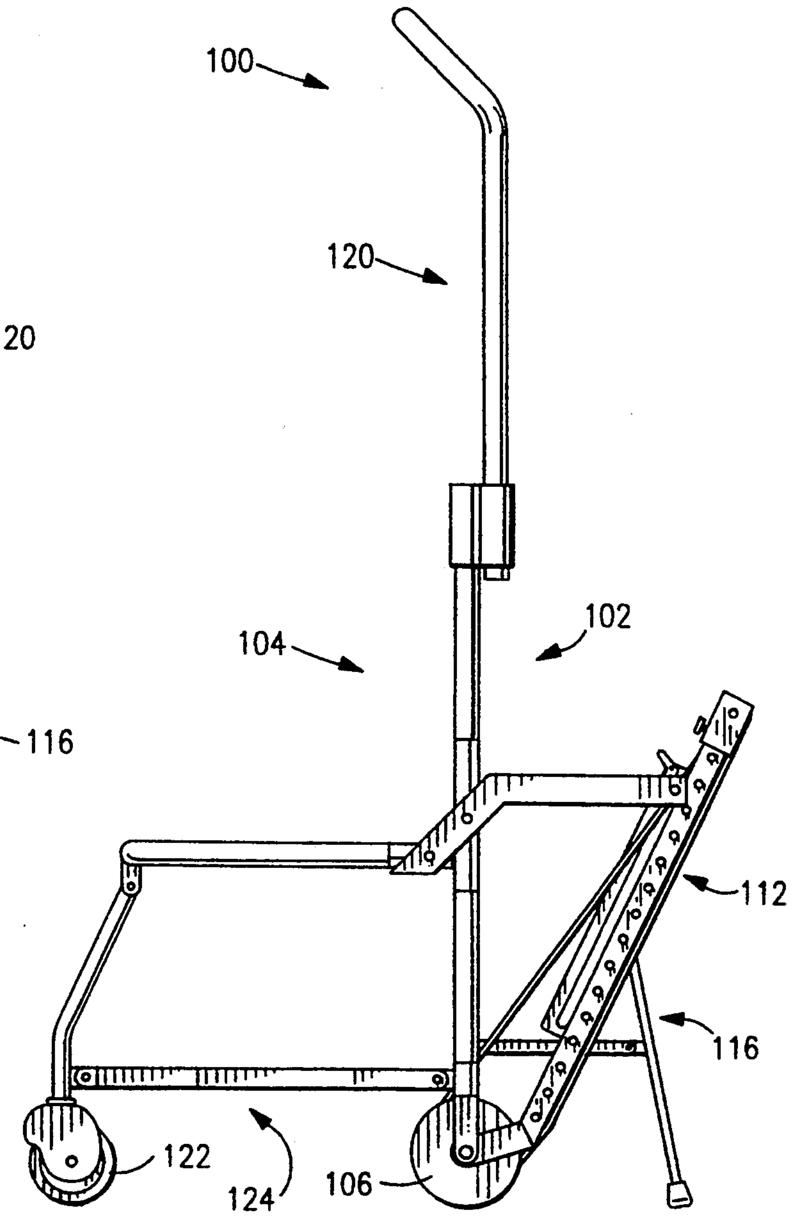
FIG. 3 is a side view of the wheelchair of FIG. 1.
Figure 6:
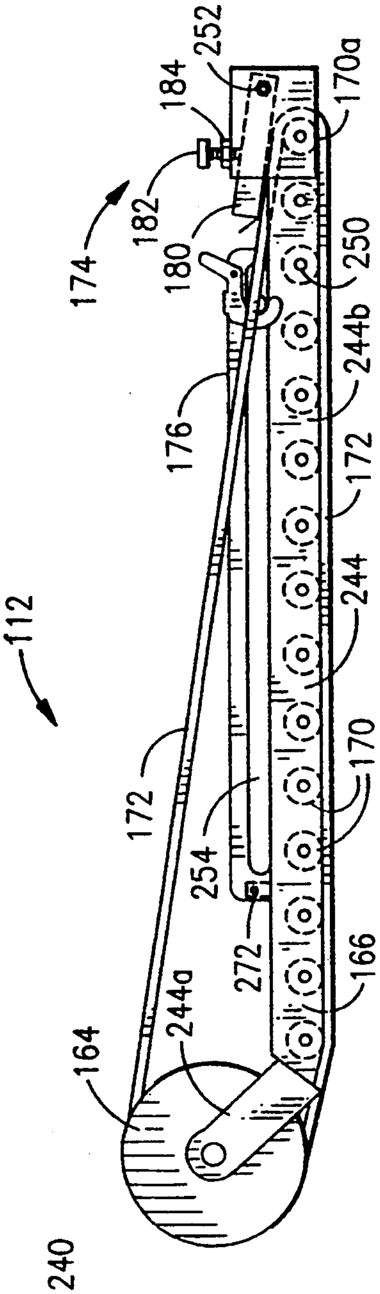
FIG. 6 is a side view of one of the rail assemblies of the wheelchair.
Figure 7:
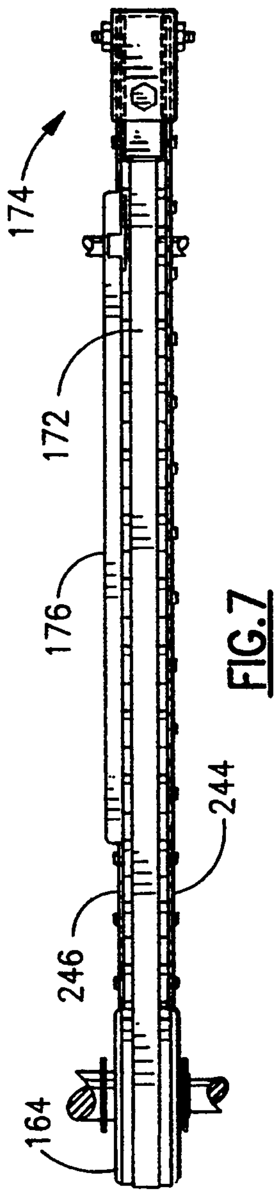
FIG. 7 is a top view of the rail assembly shown in FIG. 6.

The elements and components of wheelchair 100 are connected together so that the wheelchair can be expanded from a collapsed form, shown in FIG. 2, to an open form, shown in FIGS. 1 and 3. In its collapsed position, the wheelchair has a small, compact size and shape and, for example, the wheelchair can be easily mounted on a wall or stored in a closet or room without occupying a significant amount of space. When the wheelchair is opened, a person can be safely and securely seated and moved in the chair, and in particular, the chair can be easily moved down stairs.

Figure 5:
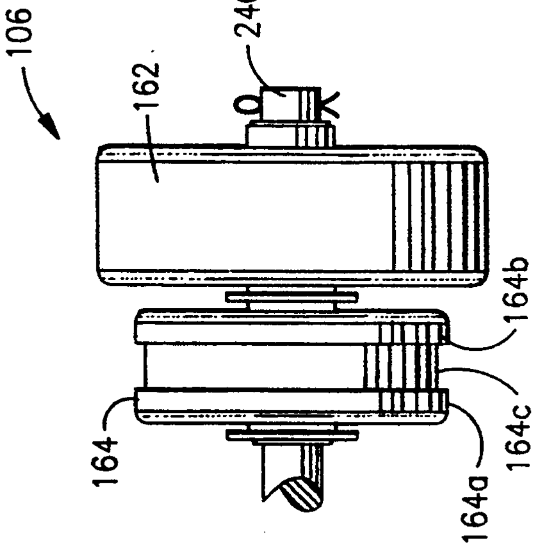
FIG. 5 is a front view of the wheel subassembly shown in FIG. 4.
Figure 4:
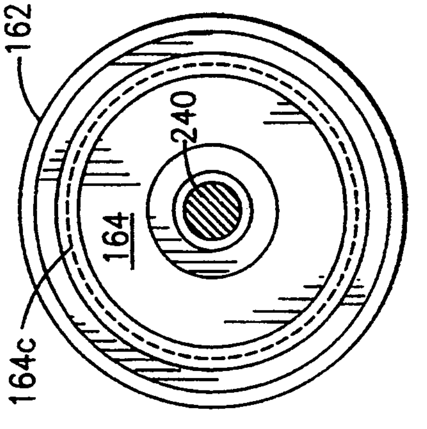
FIG. 4 is a side view of a wheel subassembly of the wheelchair.
Figure 8:
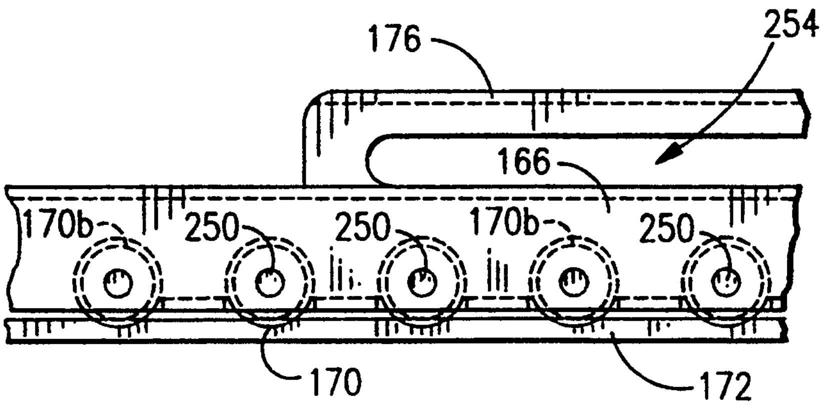
FIG. 8 is an enlarged view of a portion of the rail assembly.

With the embodiment of wheelchair 100 shown in FIGS. 1–3, main frame 102 includes left and right support members or legs 132 and 134, lower cross member 136, upper connecting members 140 and 142, and upper cross member 144; and seating assembly 104 includes left and right front side members 146 and 150, left and right back side members 152 and 154, front cross member 156, and flexible sheet 160. With particular reference to FIGS. 1, 4, and 5, each wheel subassembly 106, 110 includes outer wheel or disc 162 and inner wheel or disc 164. Also, with reference to FIGS. 1, 6, 7, and 8, each rail assembly 112, 114 includes rail member 166, a multitude of rollers 170, belt 172, brake subassembly 174, and flange 176; and this brake subassembly, in turn, includes lever 180, screw 182, and screw support 184.

In addition, back support assembly 116 includes support stand 190 and connecting links 192*a* and 192*b;* and the back support stand includes legs 194 and 196, cross members 200 and 202, and bottom caps 204. Upper frame section 120 includes left and right side members or legs 206 and 210, top cross member 212, and a pair of locking subassemblies, one of which is shown at 214 in FIGS. 10–12. Front support assembly 124 includes front vertical member 216 and left and right lateral horizontal members 220 and 222; and harness system 126 includes left and right front belt sections 224 and 226, a mid belt section 230 and a head band 232.

Left and right legs 132 and 134 of main frame 102 are generally parallel to each other and generally define the left and right sides of the wheelchair 100. Lower cross member 136 is connected to, extends between, and is supported by lower ends of legs 132 and 134, and upper cross member 144 of the main frame extends between and is supported by upper ends of legs 132 and 134. With these connections, frame members 132, 134, 136, 144 form a sturdy, rectangular shaped support frame for wheelchair 100.

Connecting members 140, 142 are securely mounted to upper ends of legs 132 and 134; and these connecting members, as discussed in detail below, are used to support and to connect upper frame section 120 to main frame 102. For example, as particularly shown in FIGS. 1 and 10, ends of the connecting members preferably include a pair of parallel, connected sleeves or tubular portions 234, 236. In use, one sleeve of each connecting member is rigidly mounted on the top of a respective one of the legs 132, 134 of main frame 102, and one of the legs 206, 210 of upper frame section 120 is inserted into the other sleeve of the connecting member. As shown in FIG. 1, upper cross member 144 is rigidly secured to and extends between connecting members 140 and 142. This is not necessary to the practice of this invention in its broadest sense, however; and, for instance, upper cross member 144 could be directly connected to legs 132 and 134.

Seating assembly 104 is pivotally connected to main frame for pivotal movement between a closed or folded position and an open or unfolded position. In the closed position, shown in FIG. 2, the front and back members 146, 150, 152, and 154 of the seating assembly extend generally parallel and closely adjacent to main frame 102; and in the unfolded position, the front and back members 146, 150, 152, and 154 of the seating assembly extend away from the main frame, generally perpendicular thereto.

Even more specifically, left back seat member 152 is connected to the left leg 132 of main frame 102 for pivotal movement about pin 234; and, as particularly viewed from the side, back seat member 152 includes a rearward portion that extends rearward from pin 234, and a forward portion that extends forwardly and downwardly from pin 234. Similarly, the right back seat member 154 is connected to right leg 134 of main frame 102 for pivotal movement about pin 236; and back seat member 154 also includes a rearward portion that extends rearward from pin 236, and a forward portion that extends forwardly and downwardly from pin 236.

Left front seat member 146 is securely connected to the forward portion of back member 152 for pivotal movement therewith about pin 234, and seat member 146 extends forward from back member 152. Also, right front seat member 150 is securely connected to the forward portion of back member 154 for pivotal movement therewith about pin 236, and seat member 150 extends forward from back member 154. Seat member 156 is connected to and laterally extends between forward portions of seat members 146 and 150. Seat members 146, 150, and 156 may be connected to each other in any suitable manner. Preferably, though, members 146, 150, and 156 are all integrally connected together and formed from a single elongated tubular element that is bent into a U-shape to form these seat members.

A forward portion of flexible sheet 160 is looped over or formed into a sleeve encircling front seat member 156, and a rearward portion of flexible sheet 160 is looped over or formed into a sleeve encircling cross member 144 of main frame 102. In this way, sheet 160 is supported by and extends between members 144 and 156; and as seating assembly 104 is pivoted into its unfolded or open position, sheet 160 is pulled open to form a seat for a person.

The two back wheel subassemblies 106 and 110 are very similar, and thus only one will be described herein in detail. With particular reference to FIGS. 1, 4, and 5, each wheel subassembly includes inside wheel or disc 164 and outside wheel or disc 162. As assembled in wheelchair 100, outside wheel 162 is laterally outside of inside wheel 164, and the two wheels are adjacent to but slightly spaced from each other. Wheels 162 and 164 are both rotatably mounted on, and are supported for rotation independent of each other, about a shaft 240, which is supported by and extends between lower ends of legs 132 and 134 of main frame 102. Outside wheel 162 has a diameter slightly larger than the diameter of inside wheel 164, and the inside wheel includes a pair of radial flanges 164*a* and 164*b* that form a central circumferential groove 164*c*.

Each of the lateral rail assemblies 112 and 114 is also pivotally connected to main frame 102 of wheelchair 100 for pivotal movement between folded or closed and unfolded or open positions. In the folded or closed position, shown in FIG. 2, the rail assemblies extend upward from a lower portion of main frame 102, generally parallel thereto; and in the unfolded or open position, shown in FIGS. 1 and 3, the rail assemblies extend upward and rearward from the lower portion of the main frame 102, at an angle of about 30° to the vertical. Moreover, preferably, the rail assemblies 112 and 114 are also connected to seating assembly 104 so that as the seating assembly is pivoted between its closed and open positions, the rail assemblies 112 and 114 are automatically moved between their closed and opened positions.

The two rail assemblies 112 and 114 shown in FIG. 1 are very similar, and thus only one will be described in detail. With particular reference to FIGS. 1, 3, and 6–8, rail member 166 of rail assembly 112 is pivotally connected to a lower portion or end of leg 132 and extends outward therefrom and from wheel subassembly 106. Preferably, rail member 166 is pivotally mounted on shaft 240. Rollers 170 are rotatably mounted on rail member 166, and these rollers are arranged in a linear sequence on the rail member extending from a position adjacent wheel subassembly 106. Belt 172 is rotatably mounted on and extends between wheel subassembly 106 and the rearward most or upward most of the rollers 170, and the belt is supported by subassembly 106 and roller 170*a,* as well as the other rollers 170, for movement around an endless path between subassembly 106 and roller 170*a.*

With the embodiment of rail assembly 112 shown in the drawings, rail member 166 includes left and right side plates 244 and 246 which are substantially identical to each other. Rail plates 244 and 246 are both rotatably mounted on shaft 240, on opposite lateral sides of wheel 164, and the rail plates extend outward from shaft 240 and are spaced apart and substantially parallel to each other. Furthermore, each rail plate includes first and second sections. The first section of each rail plate, for example as shown at 244*a*, is directly mounted on shaft 240, and the second section of each rail plate, for example as shown at 244*b*, is connected to the first section of the plate, forming an obtuse angle therewith, and extends rearward from that first section.

Rollers 170 are positioned between the parallel plates 244 and 246 and are uniformly spaced apart along the lengths of those plates. In particular, each roller is rotatably mounted on a pin or short axle 250 that, in turn, is mounted on and extends between the parallel plates 244 and 246. Pins 250 also help to connect plates 244 and 246 together and to hold those plates parallel to and spaced apart from each other the desired distance. Preferably, each of the rollers also has a pair of radial flanges and forms a central, circumferential groove 170*b*, and the belt 172 extends through the circumferential grooves 170*b* of the aligned rollers 170. In this way, rollers both support and guide movement of belt 172 between roller 170*a* and wheel subassembly 106.

Brake subassembly 174 is provided to apply an adjustable pressure to belt 172 to help control the speed at which the belt moves around its endless path and thereby to help control the speed at which wheelchair 100 moves down stairs. Lever 180 of subassembly 174 is pivotally mounted on rail member 166, and preferably the lever is disposed between plates 244 and 246 of rail member 166 and is in contact with or closely adjacent belt 172. Screw support 184 is also mounted on rail member 166, and preferably the screw support is disposed between or extends between plates 244 and 246 and is closely adjacent lever 180. Screw support 184 forms a threaded opening, and screw 182 is disposed in that opening and is supported therein for movement toward and away from belt 172. As screw 182 is threaded downward as viewed in FIG. 6, the screw engages lever 180 and causes the lever to pivot about pin 252 and into engagement with belt 172. Further downward movement of screw 182 increases the pressure between lever 180 and belt 172, retarding any movement of the belt around the rollers 170. Upward of movement of screw 182, as viewed in FIG. 6, reduces the pressure between lever 180 and belt 172, allowing the belt to move faster around rollers 170.

Flange 176 is connected to the laterally inside rail plate 246, and this flange forms an elongated groove 254 that is used to help move rail assembly 106 between its closed and open positions. More specifically, cross bar 256 extends through the two grooves 254 in the two flanges 176 of the two rail assemblies 112 and 114, and the two ends of this cross bar are rigidly secured to the back ends of members 152 and 154 of seating assembly 104. Thus, cross bar 256 pivots with the back ends of members 152 and 154, about pins 234 and 236, as seating assembly 104 pivots between its open and closed positions. With particular reference to FIG. 1, as bar 256 swings downward and inward, the bar engages the surfaces of flanges 176 that form grooves 254 and pulls the rail assemblies 112 and 114 toward main frame 102 and into the folded or closed position of the rail assemblies. Conversely, and with particular reference to FIGS. 1 and 2, as seating assembly 104 pivots from the closed position and into the open position, bar 256 swings upward and outward and this cross bar pushes rail assemblies 112 and 114 outward and into their open positions.

Figure 9:
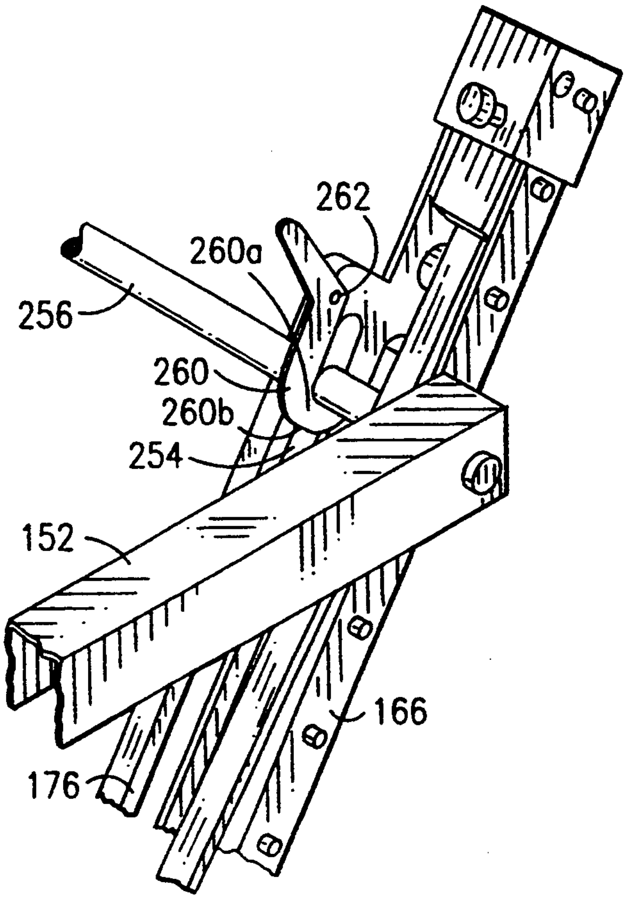
FIG. 9 is a perspective view showing another portion of the rail assembly.

As shown in FIG. 9, preferably, hook 260 is provided adjacent the top of each groove 254 to hold cross bar 256 at the tops of those grooves. More specifically, hook 260 is pivotally mounted, via pin 262, on flange 176, and is biased to a position where the lower curved portion 260*a* of the hook projects over groove 254 and in which the hook holds cross bar 256 in a comparatively fixed position, between the hook and the top of groove 254. Hooks 260 may be biased into their operative or locking positions by gravity or a spring or other resilient member may be used to bias the hooks into this position.

In addition, preferably the bottom edges 260*b* of the curved portions of the hooks 260 are themselves curved or slanted so that, as cross bar 256 slides upward through the grooves 254, the bar pushes hooks 260 aside to enable the cross bar to continue to slide upward, past the bottom of the hooks and to the top of the grooves 254. In this manner, an operator is not needed to manually swing hooks 260 out of the way as cross bar 256 slides up to the top of the grooves 254. To release bar 256 from hooks 260, and thereby to allow the cross bar to slide down grooves 254, the bottom portion of the hooks are manually pivoted away from the cross bar 256, clockwise as viewed in FIG. 9, about pin 262.

Back support assembly 116 provides additional support for wheelchair 100 and helps hold the wheelchair stable and stationary while a person is being seated in the chair. This is of significant utility because it allows that person to be seated in the wheelchair with the assistance of only one other person, and thus only one operator is needed to open or erect the wheelchair, to place another person in that chair and then to move the wheelchair down stairs.

With particular reference to FIGS. 1 and 3, left back leg 194 is pivotally connected to left rail assembly 112, and leg 194 extends downward and laterally inward from that rail assembly. Similarly, right back leg 196 is pivotally connected to right rail assembly 114, and leg 196 extends downward and laterally inward from that rail assembly. Cross members 200 and 202 are connected to and laterally extend between lower portions of legs 194 and 196 to brace those legs and to help insure that the legs pivot together. Caps 204 are mounted on the bottom ends of legs 194 and 196 for engagement with any surface on which wheelchair 100 may be positioned.

Links 192*a* and 192*b* connect back support stand 190 to main frame 102; and these links are provided to selectively hold back stand 190 in a lower or extended position, shown in FIG. 1, and to move the back stand between that lower position and a raised or retracted position. More specifically, first link 192*a* is pivotally connected to lower cross member 136 of frame 102, via bracket 266; and this link extends away from the lower frame member 136, generally perpendicular thereto. A first end of second link 192*b* is pivotally connected to first link 192*a* via a pin 270; and a second end of second link 192*b* is pivotally connected to back support stand 190.

To move backstand 190 from its lowered position and into its raised position, links 192*a* and 192*b* are pivoted relative to each other, about connecting pin 270, such that link 192a pivots generally counterclockwise about cross member 136 and link 192b pivot generally clockwise about connecting pin 270. This causes legs 194 and 196 to pivot, clockwise as viewed in FIG. 1, about the upper ends of those legs, and in particular causes the lower ends of legs 194 and 196 to move upward and forward, toward lower cross member 136. An operator may effect this movement of links 192a and 192b by using his or her hands or feet. Preferably, links 192a and 192b are pivoted together such that intermediate or lower portions of legs 194 and 196 are brought into contact with, or to positions closely adjacent to, rail assemblies 112 and 114 respectively; and magnets 272 are mounted on rail assemblies 112 and 114, specifically on lower ends of flanges 176 of those rail assemblies, to releasably hold legs 194 and 196 and backstand 190 in the raised position. As will be understood by those of ordinary skill in the art, other suitable means, such as one or more hooks or clips, may be used to help hold backstand 190 in its raised position.

Upper frame section 120 is connected to and supported by main frame 102 for movement between retracted and extended positions. With the preferred embodiment of wheelchair 100 shown in the drawings, when upper frame section 120 is in its extended position (shown in FIGS. 1 and 3), the upper frame section extends upward from the top end of main frame 102, generally parallel thereto; and when upper frame section 120 is in its retracted position (shown in FIG. 2), the upper frame section extends generally downward from the top end of main frame 102, generally rearward of the main free.

More particularly, legs 206 and 210 of upper frame section 120 are substantially straight, although the upper portion of each of these legs curves upwardly forwardly slightly, and upper cross member 212 is connected to and extends between the upper ends of legs 206 and 210. In addition, legs 206 and 210 are substantially parallel to each other and are spaced apart substantially the same distance as legs 132 and 134 of main frame 102. Legs 206 and 210 and cross member 212 may be connected together in any suitable manner, although preferably these legs and cross member 212 are integrally connected together. For example, legs 206 and 210 and cross member 212 may be made from a single, tubular shaped member that is bent into a U-shape to form the legs 206 and 210 and the upper cross member 212 shown in FIG. 1.

Figure 10:
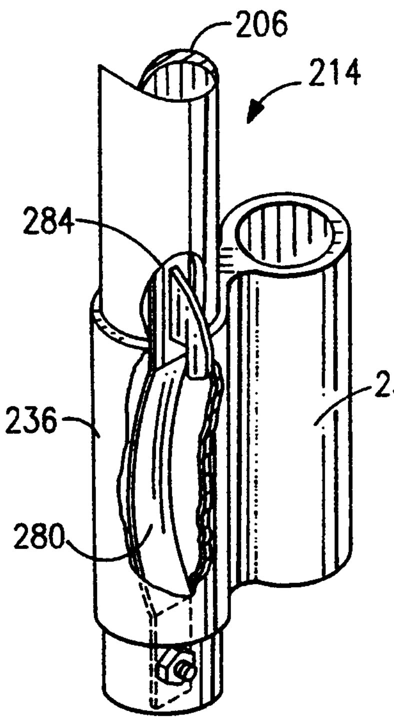
FIGS. 10 and 11 show a portion of the main frame and a portion of the upper frame section of the wheelchair.
Figure 11:
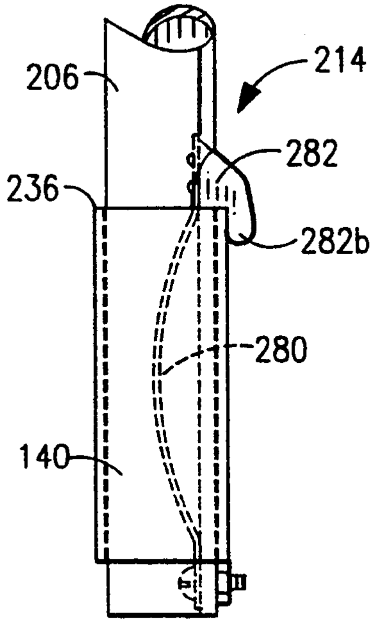

With reference to FIGS. 1, 10, and 11, upper frame section 120 is connected to main frame 102 by inserting the bottom ends of legs 206 and 210 into sleeves 236 of connecting members 140. The sizes of sleeves 236 and legs 206 and 210 are selected so that these legs will slide up and down through these sleeves, allowing the upper frame section to move between its extended and retracted positions.

Figure 12:
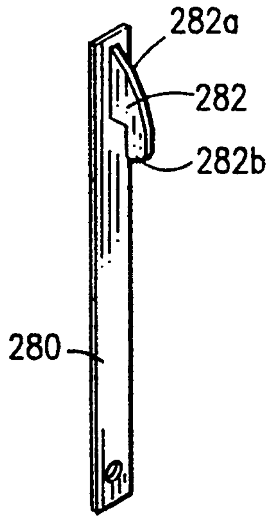
FIG. 12 shows a locking clip used to lock the upper frame section in its extended position.

The lower end of each leg 206 and 210 of upper frame section 120 is provided with a locking subassembly to releasably lock the upper frame section in its extended position. These locking subassemblies are substantially identical to each other, and one of these assemblies is shown in FIGS. 10-12. Locking subassembly 214 preferably includes a thin flexible plate 280 and a small hook 282. The lower end of plate 280 is secured to the lower end of leg 206, and plate 280 extends upward inside that leg. Hook 282 is connected to a top end of plate 280 and extends outward therefrom, through a small opening 284 in leg 206.

Plate 280 is resiliently biased to a position in which hook 282 extends through opening 284; and when upper frame section 120 is in its extended position, hook 282 extends outward, through opening 284, and directly above the top edge of sleeve 236, preventing downward movement of leg 206 through that sleeve. To move leg 206 downward, hook 282 is pressed inward by an operator, so that the hook does not project over the top edge of sleeve 236, and leg 206 is then slid downward through that sleeve. Legs 206 and 210 are preferably not locked when upper frame section 120 is in its retracted position, allowing those legs, and the entire upper frame section, to be moved quickly upwards.

Preferably, the outside edge 282a of hook 282 slants upwardly inwardly. With this slanted edge, as leg 206 moves upward, the bottom edge of sleeve 236 engages the hook and pushes the hook inward, allowing the hook to slide past the bottom edge of the sleeve without requiring that an operator manually push the hook inward. Further, preferably, hook 282 includes an outer lower lip 282b that extends over the outside surface of sleeve 236 when upper frame section 120 is locked in its extended position. This lip 282b helps to prevent hook 282 from being inadvertently slid inward, over the top edge of sleeve 236, out of the locking position of the hook shown in FIG. 11.

As mentioned above, front support assembly 124 includes front leg 216 and bottom support members 220 and 222. Front leg 216 is pivotally connected to a central portion of cross member 156 of seating assembly 104, and as shown in FIG. 1, leg 216 extends downward from that cross member 156. Bottom support member 220 is pivotally connected to cross member 136 of frame 102, adjacent leg 132; and member 220 extends forward and then inwardly from member 136, toward front leg 216. Similarly, bottom support member 222 is pivotally connected to cross member 136, adjacent leg 134; and member 222 extends forward and then inwardly from cross member 136, toward front leg 216. The front ends of members 220 and 222 are connected to each other and pivotally connected to a bracket 286 by means of a pin 290; and bracket 286, in turn, is securely connected to front leg 216.

With the above-described arrangement, as seating assembly 104 pivots into its folded position, lower members 220 and 222 of front support assembly 124 swing upward, generally about cross member 136, and front leg 216 moves upward and inward, pivoting relative to member 156 and to members 220 and 222. With reference to FIG. 2, in the collapsed position of wheelchair 100, front leg 216 of front support assembly 124 extends substantially downward from seating assembly member 156, and lower members 220 and 222 extend substantially upward from lower back cross member 136.

A bracket 292 is connected to the bottom end of front leg 216 for pivoting or swiveling movement around a vertical axis, and front wheel 122 is connected to and supported by bracket 292 for rotary movement about a horizontal axis. The pivotal movement of wheel 122 facilitates steering wheelchair 100 and also allows wheel 122 to be swung toward the back of the wheelchair, to a position shown in FIG. 2, to minimize or eliminate the projection of wheel 122 forward of front leg 216 when the wheelchair is in its collapsed position.

Harness system 126 is provided to help secure a person in wheelchair 100; and this system includes left and right belt sections 224 and 226, mid belt section 230, and head band 232. Left and right belt sections 224 and 226 are respectively mounted on legs 132 and 134 of main frame 102; and preferably these belt sections can be slid up or down along those legs, allowing the position of those belt sections to be adjusted to fit the person seating in the chair. For example, ends of belt sections 224 and 226 may form loops that are mounted on or wrapped around legs 132 and 134. Inward ends of belt sections 224 and 226 are provided with means, such as VELCRO fastner strips, to releasably connect these belt sections together. Alternatively, a mating clip and buckle may be mounted on inward ends of belt sections 224 and 226 to releasably connect these belt sections together.

Figure 15:
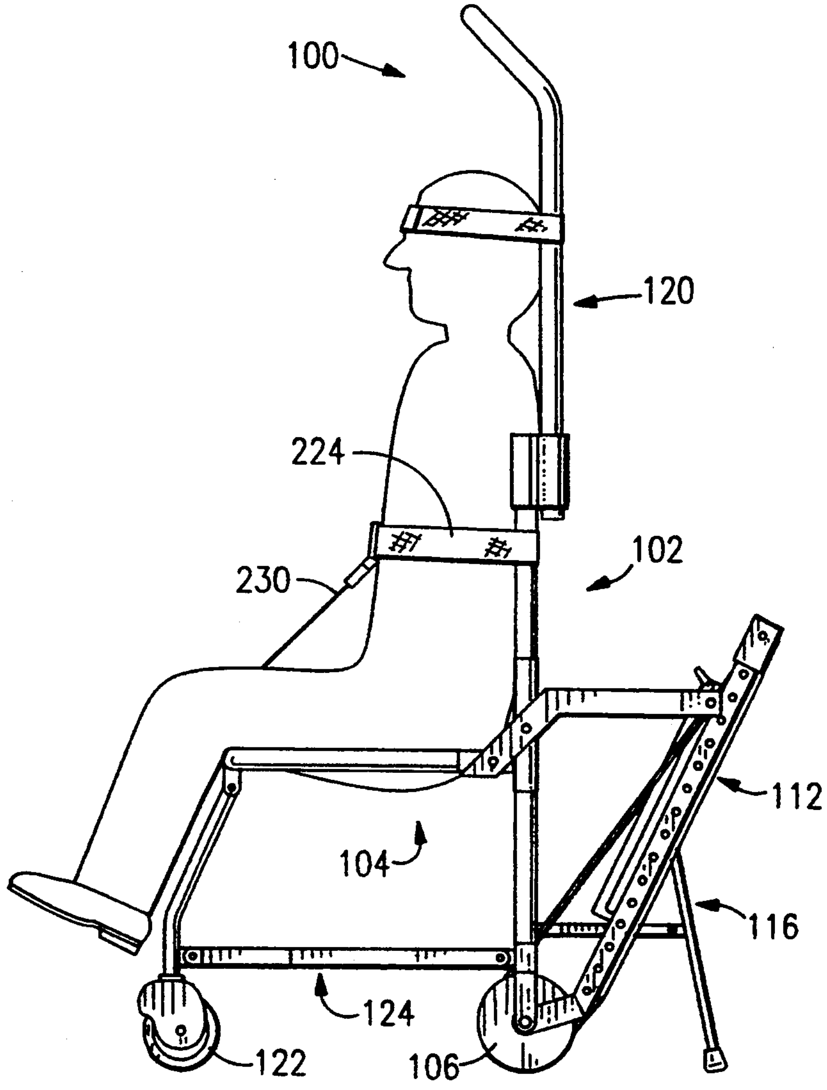
FIG. 15 illustrates the wheelchair of FIG. 1 with an occupant seated therein.

Middle belt section 230 is connected to member 156 of seating assembly 104, approximately midway along the length of that member, and this belt section is located so that the belt section is between the legs of a person seated in wheelchair 100 and can be pulled up between that occupant's legs and connected to belt sections 224 and 226. Belt section 230 may be connected to member 156 in any suitable manner; and, for instance, one end of the belt section 230 may form a loop that is mounted on or wrapped around member 156 of seating assembly 104. Also, for example, two spaced apart VELCRO fastener strips may be attached to the free end of belt section 230, and this belt section may be connected to belt sections 224 and 226 by looping that free end of section 230 around sections 224 and 226, as shown in FIG. 15 and then attaching together the VELCRO fastener strips on belt section 230. As will be understood by those of ordinary skill in the art, other suitable arrangements may be used to connect belt section 230 to belt sections 224 and 226.

Figure 13:
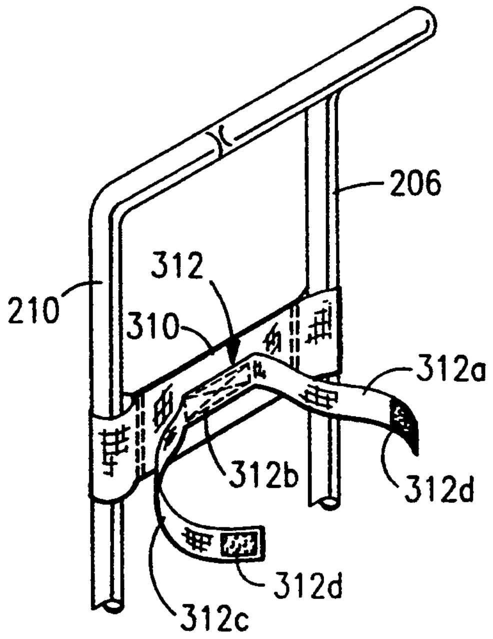
FIG. 13 shows a head band of the wheelchair.

Head band 232 is provided to help hold the head of a person seated in wheelchair 100; and in particular, to help hold that head stable or stationary relative to the wheelchair. Preferably, head band 232 includes mounting piece 310 and band 312; and with reference to FIG. 13, band 312 includes left, central, and right sections 312*a*, 312*b*, and 312*c*. Mounting piece 310 is mounted on and extends between legs 206 and 210 of upper frame section 120, and band 312 is securely attached to a central area of the mounting piece. More specifically, central section 312*b* of band 312 is directly attached to mounting piece 310, and left and right sections 312*a* and 312*c* of band 312 are connected to the central section thereof.

Band 312 has closed and opened positions. In the closed position, shown in FIG. 1, the left and right sections 312*a* and 312*c* of the band are folded over and against central section 312*b* and are connected thereto, or to each other, to hold band 312 in this closed position. In the open position, shown in FIG. 13, the left and right sections 312*a* and 312*c* of the band extend outward from left and right ends, respectively, of the central band section 312*b*. In use, band 312 is opened, a person who is seated in wheelchair 100 placed his or her head against central band section 312*b*, and left and right band sections 312*a* and 312*c* are extended against and around the forehead of that person and then connected together. The outward ends of band sections 312*a* and 312*c* are preferably provided with means 312*d*, such as VELCRO fastener strips, to connect together these sections of band 312. These connecting means may also be used to releasably hold band 312 in its closed position. Also, means such as hooks, clips, or VELCRO fastener strips may be attached to mounting piece 310 to hold band 312 in its closed position.

Mounting piece 310 is mounted on legs 206 and 210 in any suitable manner; and, for instance, the left and right ends of mounting piece 310 may form loops that are mounted on or wrapped around legs 206 and 210. Preferably, mounting piece 310 can be slid up or down legs 206 and 210. This, first, allows the height of the head band to be adjusted to fit the person seated in the wheelchair, and second, allows the head band to be moved up along upper frame section 120 so that the head band does not interfere with downward movement of the upper frame section into its retracted position.

Also, headband pieces 310 and 312 are connected together in any suitable manner. For example, central band section 312*b* may be stitched or sewn to mounting piece 310. Alternatively, hooks, clips, or VELCRO fasteners may be used to releasably connect band 312 to mounting piece 310.

Figure 14:
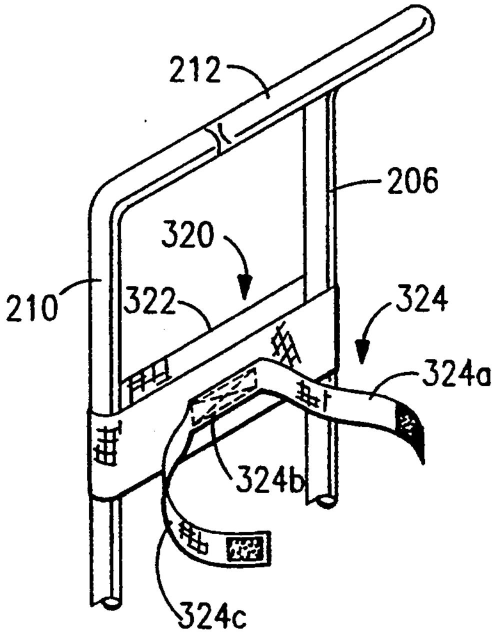
FIG. 14 is a perspective view of an alternate, easily removable head band that may be used on the wheelchair.

FIG. 14 shows a removable head band 320 that may also be used with wheelchair 100. Head band 320 also includes a mounting piece 322 and a band 324; and band 324, in turn, includes left, central, and right sections 324*a* and 324*b*, and 324*c*. Mounting piece 322 is similar to mounting piece 310; however the former mounting piece forms a single, comparatively large closed loop, and this mounting piece may be slid over cross member 212 of upper frame section 120 to place the head band 320 on, or to remove the head band from, wheelchair 100. Band 324 may operate in the same way as band 312, and band 324 of headpiece 320 may be connected to mounting piece 322 in the same way that band 312 is connected to mounting piece 310. The easily removable head band 320 may be preferred in certain situations, such as hospitals, where it may be desirable to replace the head band with a new head band each time wheelchair 100 is used.

Although the operation of wheelchair 100 is apparent from a review of the above discussion, that operation will now be summarized.

Wheelchair 100 may be stored in its compact, collapsed position, shown in FIG. 2, and the wheelchair may be fully opened by means of a simple three step procedure. In particular, to open the wheelchair, seating assembly 104 is pulled into its opened, erect position, upper frame section 120 is pulled upward into its extended position, and back support assembly 116 is pulled into its extended or lowered position. When seating assembly 104 is pulled into its opened position, front support assembly 124 and rail assemblies 112 and 114 are automatically moved into their open or operating positions. Furthermore, with the embodiment of wheelchair shown in FIGS. 1–3, when upper frame section 120 is pulled into its extended position, that frame section is automatically locked in that position by locking subassemblies 214; and when the seating and rail assemblies 104, 112, and 114 are pulled into their open positions, these assemblies are automatically locked in those positions by hooks 260.

Once wheelchair 100 is opened, a person may be seated in the chair, as shown in FIG. 15. Then, belt sections 224 and 226 may be connected together across the chest of that person, belt section 230 may be connected to belt sections 224 and 226 to further stabilize the legs and trunk of the person seated in the wheelchair, and head band 232 may be connected around the forehead of the wheelchair occupant. As a person is seated in chair, back support assembly 116 holds the wheelchair in a fixed, stationary position. This eliminates the need for a person to hold the wheelchair stationary, and hence only one person is needed to open the wheelchair and to place another person into the chair.

After a person is seated and secured in the wheelchair, backstand 190 is pivoted into its raised position, and the wheelchair is then moved. Whenever the wheelchair is moved over a flat, or comparatively flat, surface, the wheelchair is supported by front wheel 122 and wheels 162 of back wheel assemblies 106 and 110. Whenever the wheelchair is moved down stairs, the wheelchair is supported by the lateral rail assemblies 112 and 114, and in particular, by belt 172 and rollers 170, which engage and extend across the top edges of those stairs.

Figure 16:
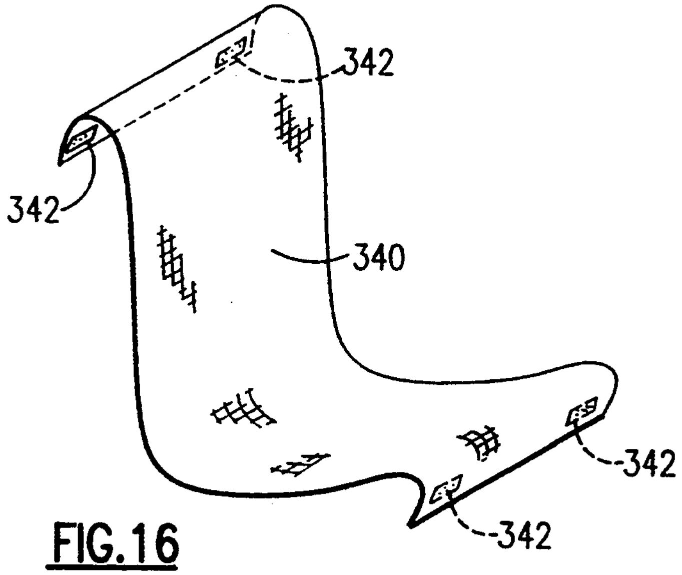
FIG. 16 shows a removable seat cover for the wheelchair.

Wheelchair 100 may be provided with, or used with, disposable seat covers for seat 160, and one suitable seat cover is shown at 340 in FIG. 16. Such seat covers may be particularly useful when the wheelchair is used in situations, such as in hospitals, with ambulances or in other medical facilities, where it is important or desirable to keep seat 160 clean and in particular, free from blood and other body fluids. Cover 340 may be releasably held on seat 160 in any suitable manner. For instance, VELCRO fastener strips 342 may be attached to cover 340 and similar strips (not shown) may be attached to seat 160, or elsewhere on wheelchair 100, to mount and hold the cover on the seat. As will be apparent, other suitable fasteners such as clips or hooks may be used to releasably hold cover 340 on seat 160.

Figure 17:
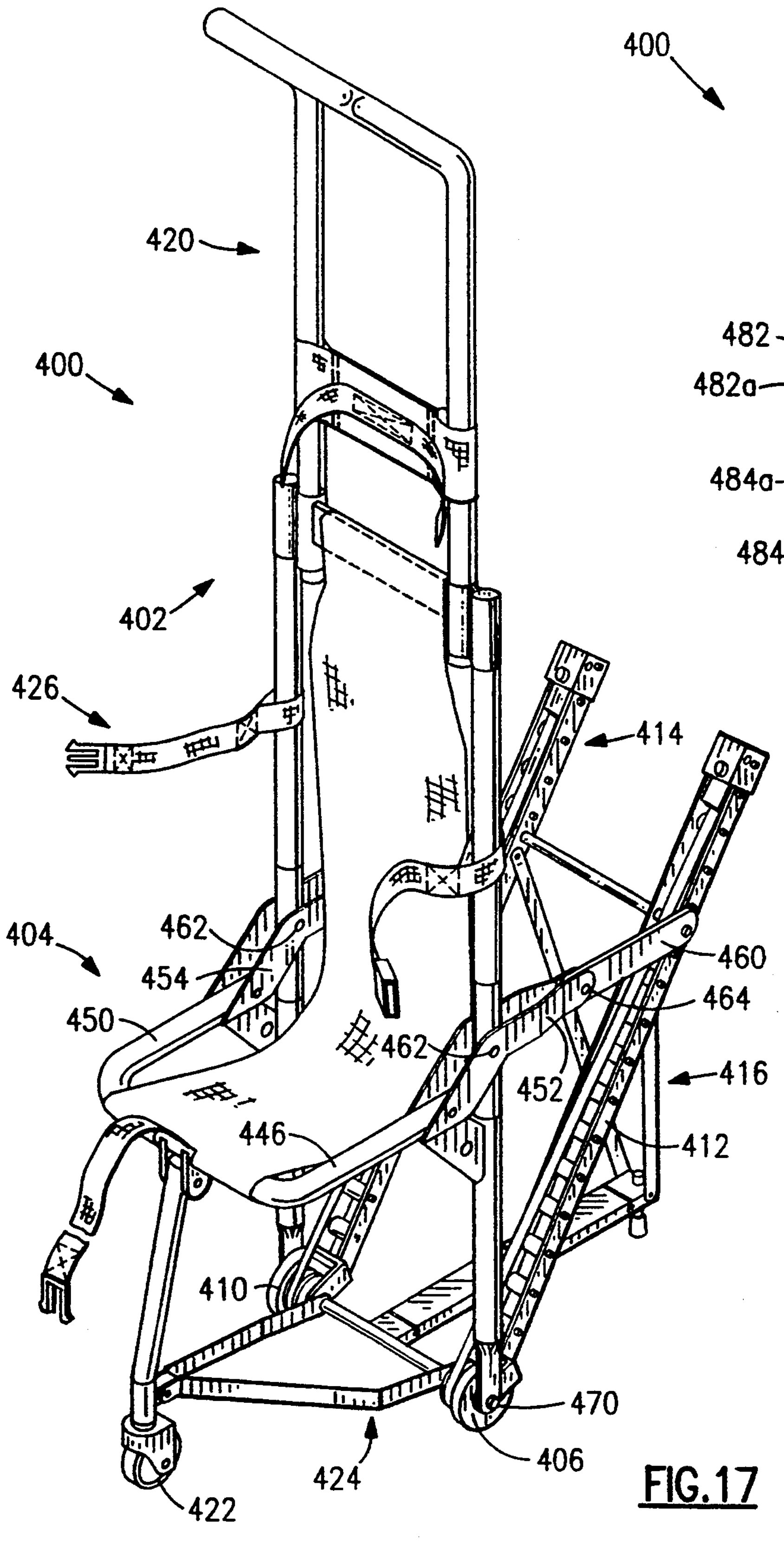
FIG. 17 shows a wheelchair constructed in accordance with an alternate embodiment of this invention.
Figure 18:
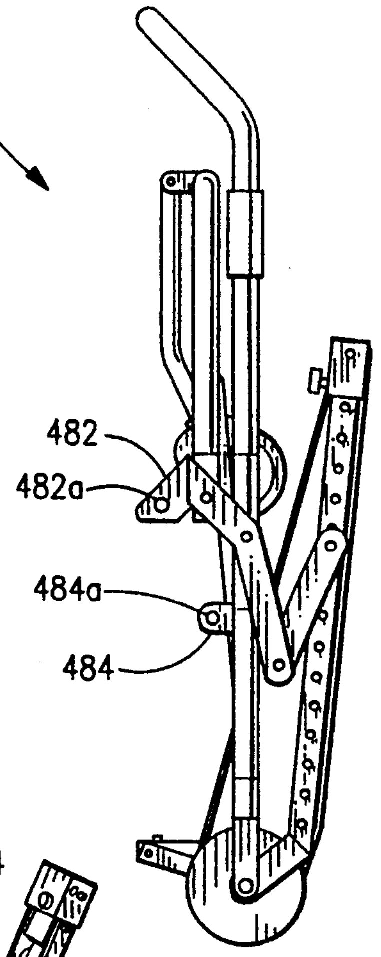
FIG. 18 shows the wheelchair of FIG. 16 in a collapsed position.

FIG. 17 illustrates wheelchair 400 constructed in accordance with an alternate embodiment of this invention. Wheelchair 400, like wheelchair 100, generally, comprises main frame 402, seating assembly 404, wheel subassemblies 406 and 410, and rail assemblies 412 and 414. Preferably, this wheelchair 400 further includes back support assembly 416, upper frame section 420, front wheel 422, front support assembly 424, and harness system 426. Also like wheelchair 100, the elements and components of wheelchair 400 are connected together so that the wheelchair can be expanded from a collapsed form, shown in FIG. 18, into an open, erect form, shown in FIG. 17.

Main frame 402, wheel subassemblies 406 and 410, rail assemblies 412 and 414, back support assembly 416, upper frame section 420, front wheel 422, front support assembly 424, and harness system 426 of wheelchair 400 are generally similar or substantially identical to the corresponding components and assemblies of wheelchair 100, and thus these components and assemblies of wheelchair 400 are not described herein in further detail. A principal difference between wheelchairs 100 and 400 relates to seating assemblies 104 and 404, and in particular, to the manner in which the seating assemblies of the wheelchairs are connected to the rail assemblies thereof.

With wheelchair 400, seating assembly 404 includes front members 446 and 450, back members 452 and 454, and a pair of connecting links 460. Side members 452 and 454 are pivotally mounted on main frame 402 for pivotal movement about pins 462, and front side members 446 and 450 are rigidly connected to and extend forward from back side members 452 and 454 respectively. A front end of each of the connecting links 460 is pivotally connected to a back end of one of the side members 452, 454 via pin 464, and a back end of each of the connecting links 460 is pivotally connected to one of the rail assemblies 412, 414.

With this arrangement, seating assembly 404 of wheelchair 400 is connected to main frame 402 for pivotal movement between a closed or folded position and an open or unfolded position. In the folded position, shown in FIG. 18, front and back members 446, 450, 452, and 454 of seating assembly 404 extend generally parallel and closely adjacent to main frame 402; and in the unfolded position, the front and back members of the seating assembly extend away from the main frame, generally perpendicular thereto.

Moreover, as seating assembly 404 of wheelchair 400 pivots from the open or unfolded position and into the folded position, the front ends of connecting links 460 are pulled downward and inward, and these links pivot upward relative to pins 464. This causes rail assemblies 412 and 414 to pivot about pins or shafts 470, pulling the rail assemblies into their folded or closed positions. Conversely, with reference to FIG. 17, as seating assembly 404 pivots from the folded position and into its open position, the front ends of connecting links 460 are pushed upward and outward, and these links pivot downward relative to pins 464. This causes rail assemblies 412 and 414 to pivot about pins or shafts 470, and pushes the rails assemblies into their unfolded positions.

Figure 19:
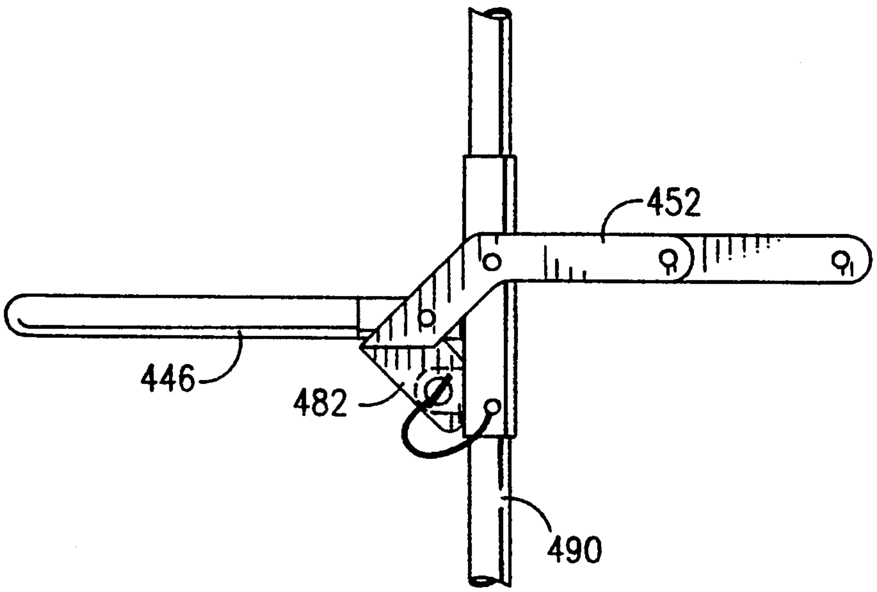
FIG. 19 is a side view of a portion of the linking mechanism of the wheelchair of FIG. 16.
Figure 20:
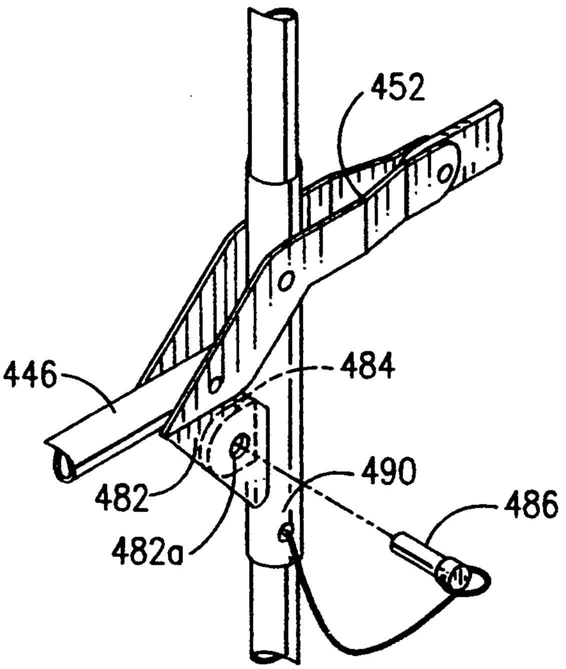
FIG. 20 is a perspective view showing the connection between the main frame and the seating assembly of the wheelchair of FIG. 16.

Wheelchair 400 is preferably provided with a locking subassembly 480 to lock the seating assembly 404 in its open position and, thereby, to lock the rail assemblies 412 and 414 in their open positions. With particular reference to FIGS. 19 and 20, this locking subassembly includes first and second brackets 482 and 484 and locking pin 486. First bracket 482 is rigidly secured to seating assembly 404, specifically back member 452 thereof; and second bracket 484 is rigidly secured to main frame 402, specifically leg 490 thereof. Each of the brackets 482, 484 defines a respective throughhole *482a, 484a;* and the brackets are positioned and dimensioned so that holes *482a, 484a* are aligned with each other when seating assembly 404 is in its unfolded or open position. Locking pin 486 may then be inserted through the aligned openings *482a, 484a* to hold brackets 482, 484 and, thus, seating assembly 404 and main frame 402 in fixed positions relative to each other. This connection between seating assembly 404 and main frame 402 also has the effect of automatically locking the rail assemblies 412 and 414 in their open positions. To unlock seating assembly 404 from main frame 402, locking pin 486 is simply removed from brackets 482 and 484, allowing the seating assembly —and the rail assemblies 412 and 414—to be pivoted into the collapsed position.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

I claim:

1. A carriage for carrying a person in a seated position down stairs under the control of an operator, the carriage comprising:

a main frame;

a seating assembly pivotally connected to the main frame for pivotal movement between open and closed positions;

a pair of wheel means rotatably mounted on the main frame to support the carriage for movement over a surface; and a rail assembly to support the carriage for movement down a series of steps, and pivotally connected to the main frame for pivotal movement between open and closed positions, the rail assembly including i) a rail member pivotally connected to the main frame, ii) a back roller rotatably mounted on the rail member adjacent a back end thereof, iii) an endless belt mounted on one of the wheel means and on the back rollers for movement around an endless path between said one of the wheel means and the back rollers, and to support the carriage for movement down the series of steps, and iv) a multitude of additional support rollers rotatably mounted on the rail member, between the wheel means and the back roller, to guide and support the endless belt as it moves around said endless path.

2. A carriage according to claim 1, wherein:

said one of the wheel means includes at least first and second discs, each of the discs being rotatably mounted on the main frame for rotary movement independent of the other of the discs;

the second disc forms a circumferential groove;

the belt is mounted in said circumferential groove for movement therearound;

when the carriage moves over the surface, said first disc engages and rolls over the surface and supports the carriage thereon; and when the carriage moves down the series of steps, the belt engages said steps and supports the carriage thereon, and the belt moves around the second disc and the multitude of rollers.

3. A carriage according to claim 2, wherein the first and second discs are coaxial.

4. A carriage for carrying a person in a seated position down stairs under the control of an operator, the carriage comprising:

a main frame;

a seating assembly pivotally connected to the main frame for pivotal movement between open and closed positions;

a pair of wheel means rotatably mounted on the main frame to support the carriage for movement over a surface; and a rail assembly to support the carriage for movement down a series of steps, and pivotally connected to the main frame for pivotal movement between open and closed positions, the rail assembly including i) a rail member pivotally connected to the main frame, ii) a multitude of rollers rotatably supported by and positioned along the rail member, iii) an endless belt mounted on one of the wheel means and on the multitude of rollers for movement around an endless path between said one of the wheel means and one of the rollers, and to support the carriage for movement down the series of steps, and iv) a braking subassembly to apply an adjustable pressure to the endless belt to help control movement of the carriage down the series of steps.

5. A carriage according to claim 4 wherein the king subassembly includes:

a lever mounted on the rail member for movement toward and away from the endless belt; and means to move the lever into pressure engagement with the endless belt and to vary the pressure between the lever and the endless belt.

6. A carriage according to claim 5, wherein the means to move the lever includes:

a screw support mounted on the rail member and forming a threaded opening; and a threaded screw supported in threaded opening for movement therein, and engaging the lever to move the lever and vary the pressure between the lever and the endless belt.

7. A carriage for carrying a person in a seated position down stairs under the control of an operator, the carriage comprising:

a main frame;

a seating assembly pivotally connected to the main frame for pivotal movement between open and closed positions;

a pair of wheel means rotatably mounted on the main frame to support the carriage for movement over a surface; and a rail assembly to support the carriage for movement down a series of steps, and pivotally connected to the main frame for pivotal movement between open and closed positions, the rail assembly including i) a rail member pivotally connected to the main frame, ii) a multitude of rollers rotatably supported by and positioned along the rail member, iii) an endless belt mounted on one of the wheel means and on the multitude of rollers for movement around an endless path between said one of the wheel means and one of the rollers, and to support the carriage for movement down the series of steps, and iv) a flange mounted on the rail member and forming an elongated groove;

wherein the seating assembly includes i) a side member pivotally mounted on the main frame and extending rearward therefrom to a position adjacent said flange, and ii) a cross bar connected to the side member for pivotal movement therewith, and extending through the elongated groove for sliding movement therealong; and wherein as the seating assembly pivots between the open and closed positions thereof, the cross bar slides along the elongated groove and pivots the rail assembly between the open and closed positions thereof.

8. A carriage according to claim 7, wherein:

an endless belt forms a loop; and the cross bar laterally extends through the loop.

9. A carriage for carrying a person in a seated position down stairs under the control of an operator, the carriage comprising:

a main frame;

a seat assembly pivotally connected to the main frame for pivotal movement between open and closed positions;

a pair of wheels rotatably mounted on the main frame to support the carriage for movement over a surface;

a rail assembly to support the carriage for movement down a series of steps, and pivotally connected to the main frame for pivotal movement between open and closed positions; and a support assembly supported for pivotal movement between raised and lowered positions, wherein in the lowered position, the support assembly engages the surface, and the support assembly and the wheels support the carriage in a stable stationary position on the surface, and in the raised position, the support assembly does not interfere with movement of the carriage.

10. A carriage according to claim 9, wherein the support assembly includes:

a support stand pivotally connected to the rail assembly for movement between raised and lowered positions; and means to hold the support stand in the lowered position thereof, and to move the support stand between the raised and lowered positions.

11. A carriage according to claim 10, wherein:

the means to hold the support stand in the lowered position includes first and second links;

the first link is pivotally connected to the main frame;

the second link is pivotally connected to the support stand;

the first and second links are pivotally connected to each other for movement between retracted and extended positions;

when the first and second links are in the extended position, the first and second links extend away form the main frame and hold the support stand in the lowered position thereof; and when the first and second links are in the retracted position, a lower portion of the support stand is closely adjacent to the main frame.

12. A carriage according to claim 10, wherein the support assembly further includes means, mounted on one of the rail assembly and the support stand, to hold the support stand in the raised position.

13. A carriage according to claim 10, wherein the support assembly further includes a magnet mounted on the rail assembly to hold the support stand in the raised position.

14. A carriage for carrying a person in a seated position down stairs under the control of an operator, the carriage comprising:

a main frame;

a seating assembly pivotally connected to the main frame for pivotal movement between open and closed positions;

a pair of back wheels rotatably mounted on the main frame to support the carriage for movement over a surface;

a rail assembly to support the carriage as the carriage moves down a series of steps, and pivotally connected to the main frame for pivotal movement between open and closed positions;

a front support assembly pivotally connected to the seating assembly and to the main frame for movement between extended and retracted positions, wherein in the extended position, the front support assembly extends forward from the main frame and downward from the seating assembly and the front support assembly engages said surface, and the front support assembly and the back wheels support the carriage for steady movement over said surface, in the retracted position, the front support assembly is closely adjacent to the main frame, and as the seating assembly moves between the open and closed positions thereof, the seating assembly moves the front support assembly between the extended and retracted positions.

15. A carriage according to claim 14, wherein:

the front support assembly includes i) a front leg pivotally connected to the seating assembly, and ii) a pair of lateral supports pivotally connected to a lower portion of the main frame and pivotally connected to the front leg when the front support assembly is in the extended position, the lateral supports extend outward from the main frame, generally perpendicular thereto; and when the front support assembly is in the retracted position, the lateral supports extend upward from the lower position of the main frame, generally parallel to the main frame.

16. A carriage for carrying a person in a seated position down stairs under the control of an operator, the carriage comprising:

a main frame;

a seating assembly pivotally connected to the main frame for pivotal movement between open and closed positions;

a pair of wheels rotatably mounted on the main frame to support the carriage for movement over a surface;

a rail assembly to support the carriage for movement down a series of steps, and pivotally connected to the main frame for movement between open and closed positions;

first and second belt sections mounted on the main frame, and including means to connect the belt sections together, across a front of a person seated in the carriage, to hold said person therein;

a third belt section mounted on the seating assembly and adapted to extend between first and second legs of the person seated in the carriage, and including means to connect the third belt section to the first and second belt section.

17. A carriage according to claim 16, wherein:

the seating assembly includes i) left and right side members pivotally connected to the main frame, and ii) a front member connected to and extending between the left and right side members; and the third belt section is mounted on the front member, generally midway between the left and right side members.

18. A carriage according to claim 16, further comprising:

an upper frame section supported by the main frame for sliding movement between extended and retracted positions; and a head band slidably mounted on the upper frame section to secure the head of the person seated in the carriage.

19. A carriage according to claim 18, wherein:

the upper frame section includes left and right legs; and the head band includes i) a back section slidably mounted on and extending between the left and right legs of the upper frame section, and ii) a front section having first and second ends, said first end being secured to the back section of the head band, said second end being releasably secured to the back section of the head band.

20. A carriage for carrying a person in a seated position down stairs under the control of an operator, the carriage comprising:

a main frame;

a seating assembly pivotally connected to the main frame for pivotal movement between open and closed positions;

a pair of wheels rotatably mounted on the main frame to support the carriage for movement over a surface;

a rail assembly to support the carriage as the carriage moves down a series of steps, and pivotally connected to the main frame for pivotal movement between open and closed positions; and a linking member pivotally connected to both the seating assembly and to the rail assembly, the linking member moving the rail assembly between the open and closed positions thereof as the seating assembly pivots between the open and closed positions thereof.

21. A carriage according to claim 20, further comprising locking means to releasably lock the seating assembly and the rail assembly in their open positions.

22. A carriage according to claim 21, wherein:

the locking means includes first and second brackets and a locking pin;

the first bracket is mounted on the seating assembly and forms a first through opening;

the second bracket is mounted on the main frame and forms a second through opening;

when the seating assembly is in the open position, the first and second through openings are aligned with each other;

the locking pin is adapted to be inserted through the first and second openings to releasably connect together the first and second brackets.

23. A carriage according to claim 20, wherein:

the seat assembly extends both forward and rearward of the main frame;

the rail assembly extends rearward of the main frame; and the linking member is pivotally connected to the seating assembly rearward of the main frame.

* * * * *

UNITED STATES PATENT AND TRADEMARK OFFICE

CERTIFICATE OF CORRECTION

PATENT NO. : 5,338,048
DATED : August 16, 1994
INVENTOR(S) : Henry Medina

It is certified that error appears in the above-indentified patent and that said Letters Patent is hereby corrected as shown below:

Column 9, line 34: "free" should read --frame--

Column 11, line 11: "fastner" should read --fastener--

Column 15, line 14, Claim 1: "rollers" should read --roller--

Column 16, line 1, Claim 5: "king" should read --braking--

Column 17, line 32, Claim 11: "form" should read --from--

Signed and Sealed this

Tenth Day of January, 1995

Attest:

BRUCE LEHMAN

*Attesting Officer*

*Commissioner of Patents and Trademarks*